United States Patent
Kudo

(10) Patent No.: US 7,251,067 B2
(45) Date of Patent: Jul. 31, 2007

(54) OPTICAL SCANNING APPARATUS

(75) Inventor: Genichiro Kudo, Tochigi-ken (JP)

(73) Assignee: Canon Kabushiki Kaisha, Ohta-ku, Tokyo (JP)

( * ) Notice: Subject to any disclaimer, the term of this patent is extended or adjusted under 35 U.S.C. 154(b) by 0 days.

(21) Appl. No.: 11/482,568

(22) Filed: Jul. 7, 2006

(65) Prior Publication Data

US 2006/0250673 A1    Nov. 9, 2006

Related U.S. Application Data

(62) Division of application No. 11/059,613, filed on Feb. 15, 2005, now abandoned.

(30) Foreign Application Priority Data

Feb. 18, 2004    (JP)    ............... 2004-041483

(51) Int. Cl.
*G02B 26/08* (2006.01)

(52) U.S. Cl. ...................... 359/205; 347/259

(58) Field of Classification Search ........ 359/205–208; 347/259, 260
See application file for complete search history.

(56) References Cited

U.S. PATENT DOCUMENTS

| 5,818,506 A | 10/1998 | Yamaguchi et al. |
| 6,084,696 A | 7/2000 | Hama |
| 6,104,522 A | 8/2000 | Hayashi et al. |
| 6,185,029 B1 | 2/2001 | Ishihara |
| 6,836,281 B2 * | 12/2004 | Kimura ..................... 347/258 |
| 2002/0018112 A1 | 2/2002 | Nishiguchi et al. |

FOREIGN PATENT DOCUMENTS

| JP | 2-35413 A | 2/1990 |
| JP | 7-294837 A | 11/1995 |
| JP | H09-080334 | 3/1997 |

* cited by examiner

Primary Examiner—Euncha P. Cherry
(74) Attorney, Agent, or Firm—Morgan & Finnegan, L.L.P.

(57) ABSTRACT

The present invention has as its object to provide a compact optical scanning apparatus of high performance. So, in the present invention, an optical scanning apparatus comprised of two or more reflecting mirrors is of a construction in which the optical characteristics of the mirrors are made different from each other, and an unevenness in light quantity on a surface to be scanned is corrected.

10 Claims, 11 Drawing Sheets

OPTICAL SCANNING APPARATUS

This application is a divisional of application Ser. No. 11/059,613, filed Feb. 15, 2005 now abandoned, which is incorporated by reference in its entirety.

BACKGROUND OF THE INVENTION

1. Field of the Invention

This invention relates to an optical scanning apparatus for use in an image forming apparatus such as a laser beam printer or a digital copying machine.

2. Related Background Art

An optical scanning apparatus heretofore used in an image forming apparatus such as a laser beam printer or a digital copying machine directs a beam emitted from a light source to a deflecting element by incidence optical means, causes the beam deflected by the deflecting element to be imaged into a spot shape on a photosensitive drum surface which is a surface to be scanned by scanning optical means, and optically scans on the photosensitive drum surface with the beam.

In such an optical scanning apparatus, the beam emitted from the light source is converted into substantially parallel light beam by a collimator lens or the like, and in order to effect an optical face tangle error correction, the beam converted in substantially parallel light is formed into a linear image near a deflecting surface by a cylindrical lens. The photosensitive drum surface is scanned with the beam deflected by the deflecting surface of the deflector at a substantially constant speed by a scanning lens, and forms a spot.

In FIG. 9 of the accompanying drawings, the reference characters 1a, 1b, 1c and 1d designate light source means, each of which comprises, for example, a semiconductor laser. The reference characters 2a, 2b, 2c and 2d denote cylindrical lenses, each of which has predetermined refractive power in only a sub-scanning direction. Each of the light source means 1 and the cylindrical lenses 2 constitutes an element of incidence optical means.

The reference numeral 3 designates a light deflector as a deflecting element, and it comprises, for example, a rotating polygon mirror, and is rotated at a constant speed in the direction of arrow A by driving means (not shown) such as a motor. The reference numeral 11 denotes three fθ lenses having an fθ characteristic, and in a sub-scanning cross section, they bring the vicinity of the deflecting surfaces 3a and 3b of the light deflector 3 and the vicinity of photosensitive drum surfaces 100a, 100b, 100c and 100d as surfaces to be scanned into a conjugate relation to thereby have an optical face tangle error correcting function.

Also, in order to make the image forming apparatus compact, a return mirror for folding an optical path is disposed downstream of the deflector to thereby achieve compactness.

In the above-described conventional optical scanning apparatus, since a scanning lens is constituted by glass lens, usually an antireflection coat is provided on the surface of the lens and surface reflection does not occur, that is, it is difficult for an unevenness in light quantity on the surface to be scanned to occur.

The scanning lens is recent years, however, is constituted by a plastic lens and is designed to achieve a lower price and higher performance. In an optical scanning apparatus comprised of such a plastic-lens, it is generally difficult to provide an antireflection coat on the surface of the lens and therefore, there occurs unevenness in light quantity on the surface to be scanned caused by Fresnel reflection on the surface of the lens being changed by a scanning angle.

In order to solve these problems, as disclosed in Japanese Patent Application Laid-open No. H2-35413, it is known to set the reflectance of a return mirror so that reflectance near an optical axis and off-axis reflectance may differ from each other, and correct the unevenness in light quantity on the surface to be scanned. Also, as disclosed in Japanese Patent Application Laid-open No. H7-294837, there is known a technique of converting linearly polarized light into elliptically polarized light on this side of deflecting means, and correcting the unevenness in light quantity on the surface to be scanned, and as disclosed in U.S. Pat. No. 6,084,696, there is known a technique of changing the transmittance of an optical material to thereby correct the unevenness in light quantity on the surface to be scanned.

In an optical scanning apparatus described in Japanese Patent Application Laid-open No. H2-35413, however, (1) consideration is given only to the reflecting characteristic depending on a polarizing direction, (2) consideration is given only to the unevenness in light quantity due to the transmittance of the interior of the lens, and (3) there is disclosed only a technique when a single return mirror is used in an optical path, and therefore, nothing is stated clearly about an unevenness in light quantity caused by surface reflection when the scanning lens is formed of plastics, and the correction of an unevenness in light quantity when there are two or more return mirrors in the optical path. Also, the technique disclosed in Japanese Patent Application Laid-open No. H7-294837 further requires optical members, and in the technique disclosed in U.S. Pat. No. 6,084,696, it is foreseen that the optical material is expensive, and by any of these techniques, it is difficult to construct an inexpensive optical scanning apparatus.

SUMMARY OF THE INVENTION

The present invention can provide an image forming apparatus of a low price and high quality having an optical scanning apparatus in which a scanning lens is formed of plastics and which has two or more return mirrors in an optical path, wherein at least one of the return mirrors is constituted by such reflecting coating as can obtain desired reflectance in conformity with an incidence angle and a polarizing direction, and an unevenness in light quantity on a surface to be scanned by reflection on the surface of the lens is corrected. Also, the present invention can provide at a low price an image forming apparatus of a high speed which can also correct unevenness in image plane illuminance due to the fall of the light amount at the end portion of an image in an overfilled scanning apparatus.

According to one aspect of the invention, an optical scanning apparatus comprises light source means having a light emitting portion emitting a beam, deflecting means, an imaging optical system for causing the beam deflected by the deflecting means to be imaged into a spot shape on a surface to be scanned, and a plurality of mirrors provided in an optical path between the deflecting means and the surface to be scanned, wherein at least two of the plurality of mirrors differ in reflectance for an on-axial ray from each other, and reflectance for the on-axial ray and reflectance for an off-axial ray of each of the at least two of the plurality of mirrors are different from each other.

According to a further aspect of the invention, in the optical scanning apparatus, the reflectance for the on-axial ray and the reflectance for the off-axial ray of each of said at least two of said plurality of mirrors are made different from each other in order to compensate for unevenness in image plane illuminance on said surface to be scanned.

According to another aspect of the invention, an optical scanning apparatus comprises light source means having a light emitting portion emitting a beam, deflecting means, an imaging optical system for causing the beam deflected by the deflecting means to be imaged into a spot shape on a surface to be scanned, and a plurality of mirrors provided in an optical path between the deflecting means and the surface to be scanned, wherein at least two of the plurality of mirrors differ in reflectance for an on-axial ray from each other, and reflectance for the on-axial ray and reflectance for an off-axial ray of a mirror having the lowest reflectance among the plurality of mirrors are different from each other.

According to a further aspect of the invention, in the optical scanning apparatus, reflectance for the on-axial ray and reflectance for the off-axial ray of said mirror having the lowest reflectance among said plurality of mirrors are made different from each other in order to compensate for unevenness in image plane illuminance on said surface to be scanned.

According to a further aspect of the invention, in the optical scanning apparatus, light beam emitted from said light source means is P-polarized with respect to and incident on an incidence surface of an fθ lens constituting said imaging optical system; and wherein reflectance for the on-axial ray of said mirror of the lowest reflectance among said plurality of mirrors than that for the off-axial ray thereof.

According to another aspect of the invention, an optical scanning apparatus comprises light source means having a light emitting portion emitting a beam, deflecting means, an imaging optical system for causing the beam deflected by the deflecting means to be imaged into a spot shape on a surface to be scanned, and a plurality of mirrors provided in an optical path between the deflecting means and the surface to be scanned, wherein a width of the light beam incident on a deflecting surface of the deflecting means in a main scanning direction is greater than the width of the deflecting surface in the main scanning direction; wherein at least two of the plurality of mirrors differ in reflectance for an on-axial ray from each other; and wherein reflectance for the on-axial ray of a mirror having the lowest reflectance among the plurality of mirrors is smaller than reflectance for an off-axial ray thereof.

According to a further aspect of the invention, in the optical scanning apparatus, reflectance for the on-axial ray of said mirror of the lowest reflectance among said plurality of mirrors is made smaller than that for the off-axial ray thereof in order to compensate for unevenness in image plane illuminance on said surface to be scanned.

According to another aspect of the invention, an optical scanning apparatus comprises light source means having a light emitting portion emitting a beam, deflecting means, an imaging optical system for causing the beam deflected by the deflecting means to be imaged into a spot shape on a surface to be scanned, and a plurality of mirrors provided in an optical path between the deflecting means and the surface to be scanned, wherein reflectance for an on-axial ray of each of at least two of the plurality of mirrors is 90% or less, and reflectance for the on-axial ray thereof and reflectance for an off-axial ray thereof are different from each other.

According to a further aspect of the invention, in the optical scanning apparatus, an fθ lens constituting the imaging optical system is a plastic lens.

According to another aspect of the invention, an image forming apparatus comprises the optical scanning apparatus set out in the foregoing, a photosensitive member disposed on the surface to be scanned, a developing device for developing an electrostatic latent image formed on the photosensitive member by the beam scanned by the optical scanning apparatus as a toner image, a transferring device for transferring the developed toner image to a transfer material, and a fixing device for fixing the transferred toner image on the transfer material.

According to another aspect of the invention, an image forming apparatus comprises the optical scanning apparatus set out in the foregoing, and a printer controller for converting code data inputted from an external device into an image signal and inputting it to the optical scanning apparatus.

According to another aspect of the invention, a color image forming apparatus comprises a plurality of optical scanning apparatuses, each of which comprises the optical scanning apparatus set out in the foregoing, and a plurality of image bearing members disposed on the surfaces to be scanned of the respective optical scanning apparatuses for forming images of different colors thereon.

According to a further aspect of the invention, the color image forming apparatus further comprises a printer controller for converting a color signal inputted from an external device into image data of different colors and inputting them to the respective optical scanning apparatuses.

According to the present invention, as previously described, in the optical scanning apparatus constituted by two or more reflecting mirrors, the optical characteristics of the mirrors are made different from one another, and the unevenness in light quantity on the surface to be scanned is corrected, whereby it becomes possible to provide a compact optical scanning apparatus of high performance.

Also, according to the present invention, it is possible to reduce unevenness of a formed image in density occurring in a color image forming apparatus for superimposing different images on a plurality of photosensitive members one upon another.

DESCRIPTION OF THE PREFERRED EMBODIMENTS

Embodiment 1

Figure 1:
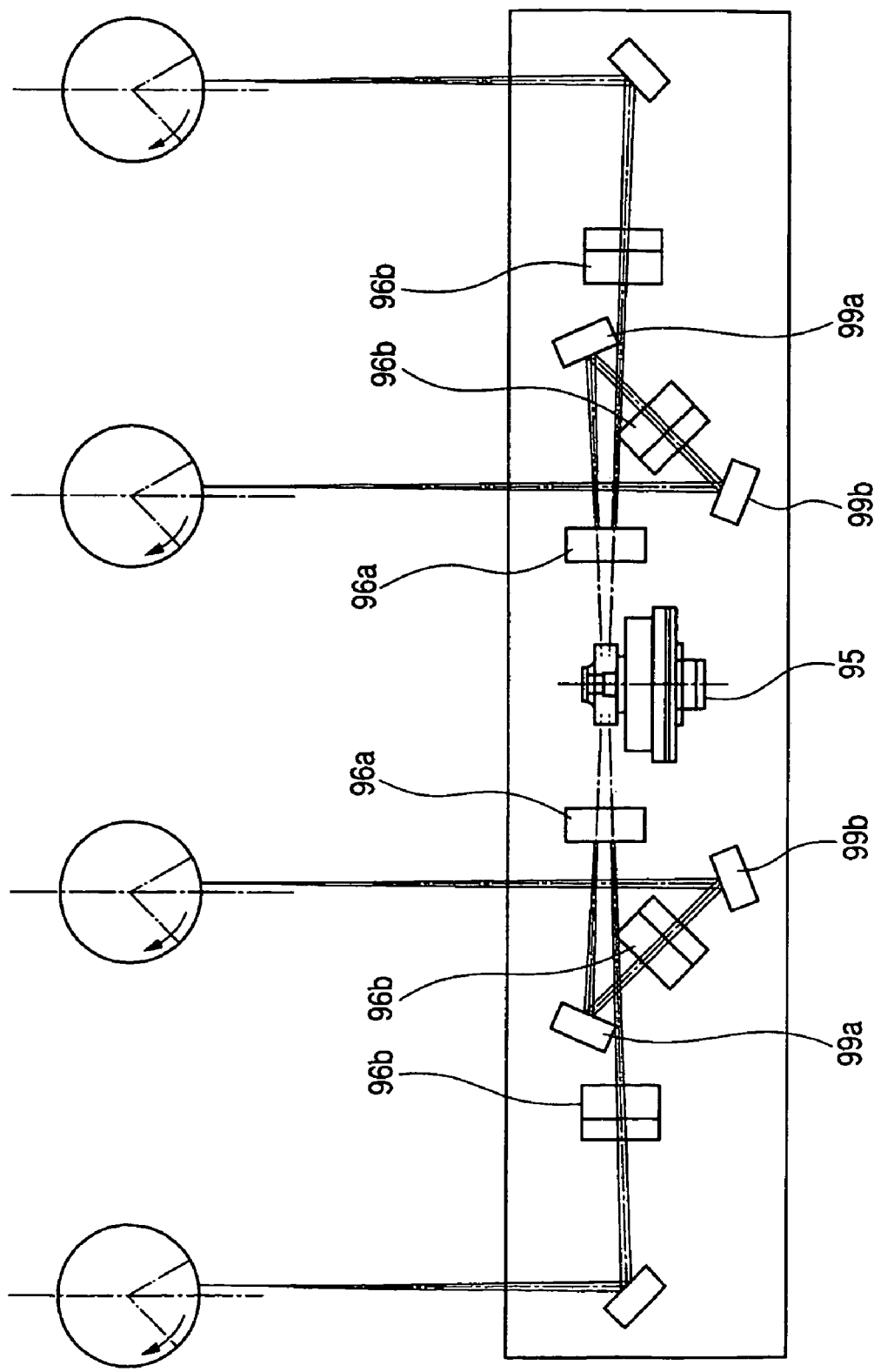
FIG. 1 is a sub-scanning cross-sectional view in an optical scanning apparatus according to Embodiment 1.
Figure 2:
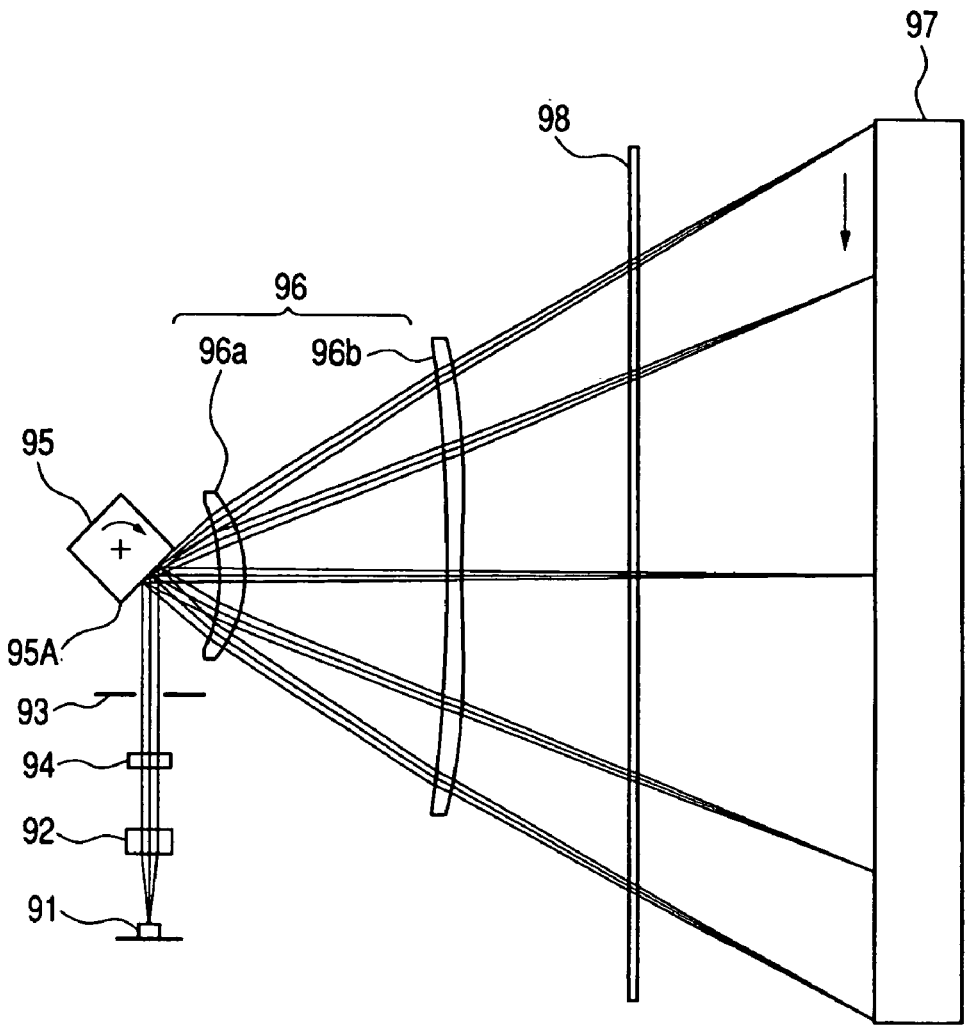
FIG. 2 is a developed view in a main scanning cross section of an optical system in Embodiment 1.

FIG. 1 is a sub-scanning cross-sectional view of the optical scanning apparatus of the present invention. FIG. 2 is a developed view in a main scanning cross section of an optical system in the optical scanning apparatus of the present invention.

The return mirror of the present invention is a plane mirror, and has no optical power in a main scanning direction and a sub-scanning direction.

In FIG. 2, the reference numeral 91 designates a light source such as a semiconductor laser, and the reference numeral 92 denotes a collimator lens for converting divergent light from the light source into a parallel beam. The beam emitted from the light emitting portion of the light source 91 is single.

Also, the optical scanning apparatus adopts an underfilled optical system (UFS) in which the width of the beam incident on a polygon mirror 95 in the main scanning direction is smaller than the width of a deflecting surface 95A in the main scanning direction.

The present invention, however, can also be applied to a light source having two or more light emitting portions. Further, it can also be applied to a multi-beam light source having three or more light emitting portions. For example, an end surface light emitting type monolithic multi-semiconductor laser and a plane light emitting type monolithic multi-semiconductor laser may be mentioned.

The reference numeral 93 designates an aperture stop which adjusts the diameter of a beam passing therethrough.

The reference numeral 94 denotes a cylindrical lens as a second optical system, and it has predetermined refractive power only in the sub-scanning direction, and causes the beam to be imaged as a substantially linear image on the deflecting surface 95A of the deflector 95 in a sub-scanning cross section after the beam has passed through the aperture stop 93.

The reference numeral 95 designates a polygon mirror as a deflector, and it is rotated at a uniform speed in the direction of arrow.

The reference numeral 96 denotes an imaging optical system as a third optical system, and each of an fθ lens 96a and an fθ lens 96b is constituted by an anamorphic lens of an aspherical shape in a main scanning cross section, and it causes the beam deflected by the deflector 95 to be imaged on a photosensitive drum surface as a surface to be scanned, and corrects the surface tangle error of the deflector (optical face tangle error correcting system).

In the present embodiment, the shapes of the first and second scanning lenses 96a and 96b constituting a scanning lens system 6 are represented by the functions of the following expressions.

Assuming, for example, each of the points of intersections of the first and second scanning lenses 96a and 96b and an optical axis be as respective origin, and the optical axis be the X-axis, and a direction orthogonal to the optical axis in the main scanning cross section be the Y-axis, and a direction orthogonal to the optical axis in a sub-scanning cross section be the Z-axis, the surface shape in the main scanning cross section on the scanning start side with respect to the optical axis as shown in FIG. 1 is represented by $$x = \frac{y^2/R}{1+\sqrt{1-(1+K)(y/R)^2}} + B_{4s}y^4 + B_{6s}y^6 + B_{8s}y^8 + B_{10s}y^{10}$$

and the surface shape in the main scanning cross section on the scanning end side is represented by $$x = \frac{y^2/R}{1+\sqrt{1-(1+K)(y/R)^2}} + B_{4e}y^4 + B_{6e}y^6 + B_{8e}y^8 + B_{10e}y^{10}$$

where R represents a radius of curvature, and K, B4, B6, B8 and B10 represent aspherical surface coefficients.

In the present embodiment, the shapes of the first and second scanning lenses 96a and 96b in the main scanning cross section are formed substantially symmetrically with respect to the optical axis, that is, the aspherical surface coefficients on the scanning start side and the scanning end side are made coincident with each other.

Also, in the sub-scanning cross section, on the scanning starting side and the scanning end side with respect to the optical axis, the radius of curvature of the emergence surface (the lens surface most adjacent to the surface to be scanned) r4 of the second scanning lens 96b is continuously changed in the effective portion of the scanning lens 96b.

The emergence surface r4 is designed so as to be strongest in refractive power (power, i.e. the reciprocal of a focal length) among the plurality of lens surfaces of a plurality of lenses constituting a scanning lens system. Also, the first scanning lens 96a includes a non-arcuate surface in the main scanning cross section.

As shown in FIG. 2, assuming that the optical axis be the X-axis, and a direction orthogonal to the optical axis in the main scanning cross section be the Y-axis, and a direction orthogonal to the optical axis in the sub-scanning cross section be the Z-axis, the shapes of the first and second scanning lenses 96a and 96b in the sub-scanning cross section can be represented by the following continuous functions. The surface shape on the scanning start side with respect to the optical axis is represented by $$S = \frac{z^2/r'}{1+\sqrt{1-(z/r')^2}} \quad r' = r(1 + D_{2s}y^2 + D_{4s}y^4 + D_{6s}y^6 + D_{8s}y^8 + D_{10s}y^{10})$$

and the surface shape on the scanning cross end side with respect to the optical axis is represented by $$S = \frac{z^2/r'}{1+\sqrt{1-(z/r')^2}} \quad r' = r(1 + D_{2e}y^2 + D_{4e}y^4 + D_{6e}y^6 + D_{8e}y^8 + D_{10e}y^{10})$$

where r' represents the radius of curvature in the sub-scanning direction, and D2, D4, D6, D8 and D10 represent coefficients. And the suffix s of the coefficients represents the scanning start side, and the suffix e of the coefficients represents the scanning end side. The radius of curvature in the sub-scanning direction refers to the radius of curvature within a cross section orthogonal to the shape (meridian line) in the main scanning direction.

The optical parameters of the present embodiment are shown below.

| | | | |
|---|---|---|---|
| Used Wavelength (mm) | | 7.90E−07 | |
| Refractive Index of fθ Lens | | 1.524 | |
| Incidence Angle in Main Scanning Direction (deg.) | | 90 | |
| Incidence Angle in Sub-Scanning Direction (deg.) | | 2.2 | |
| Deflecting Point-G1R1 (mm) | | 1.65E+01 | |
| Focal Length of fθ Lens (mm) | | 1.50E+02 | |

| | Surface R1 | | Surface R2 | |
|---|---|---|---|---|
| Type ST2 | Scanning Start Side (s) | Scanning End Side (e) | Scanning Start Side (s) | Scanning End Side (e) |
| Main Scanning | d  6.00E+00 | | d  4.80E+01 | |
| | R  −3.62E+01 | | R  −2.48E+01 | |
| | K  −1.18E+00 | K  −1.18E+00 | K  −2.26E+00 | K  −2.26E+00 |
| | B4  5.67E−06 | B4  5.67E−06 | B4  −1.05E−05 | B4  −1.05E−05 |
| | B6  2.76E−08 | B6  2.76E−08 | B6  2.55E−08 | B6  2.55E−08 |
| | B8  −1.31E−10 | B8  −1.31E−10 | B8  −1.84E−11 | B8  −1.84E−11 |
| | B10  1.13E−13 | B10  1.13E−13 | B10  −5.89E−14 | B10  −5.89E−14 |
| Sub-Scanning | r  −1.00E+0.3 | r | r  −1.00E+0.3 | r |
| | D2  0.00E+00 | D2  0.00E+00 | D2  0.00E+00 | D2  0.00E+00 |
| | D4  0.00E+00 | D4  0.00E+00 | D4  0.00E+00 | D4  0.00E+00 |
| | D6  0.00E+00 | D6  0.00E+00 | D6  0.00E+00 | D6  0.00E+00 |
| | D8  0.00E+00 | D8  0.00E+00 | D8  0.00E+00 | D8  0.00E+00 |
| | D10  0.00E+00 | D10  0.00E+00 | D10  0.00E+00 | D10  0.00E+00 |

| | Surface R3 | | Surface R4 | |
|---|---|---|---|---|
| Type ST2 | Scanning Start Side (s) | Scanning End Side (e) | Scanning Start Side (s) | Scanning End Side (e) |
| Main Scanning | d  4.00E+00 | | d  9.95E+01 | |
| | R  −4.61E+02 | | R  8.36E+02 | |
| | K  0.00E+00 | K  0.00E+00 | K  −3.58E+01 | K  −3.58E+01 |
| | B4  0.00E+00 | B4  0.00E+00 | B4  −1.02E−06 | B4  −1.02E−06 |
| | B6  0.00E+00 | B6  0.00E+00 | B6  2.09E−10 | B6  2.09E−10 |
| | B8  0.00E+00 | B8  0.00E+00 | B8  −3.39E−14 | B8  −3.39E−14 |
| | B10  0.00E+00 | B10  0.00E+00 | B10  2.68E−18 | B10  2.68E−18 |
| Sub-Scanning | r  −1.00E+03 | r | r  −2.14E+01 | r |
| | D2  0.00E+00 | D2  0.00E+00 | D2  1.81E−04 | D2  1.69E−04 |
| | D4  0.00E+00 | D4  0.00E+00 | D4  −8.03E−08 | D4  −6.92E−08 |
| | D6  0.00E+00 | D6  0.00E+00 | D6  3.07E−11 | D6  2.19E−11 |
| | D8  0.00E+00 | D8  0.00E+00 | D8  −7.61E−15 | D8  −4.14E−15 |
| | D10  0.00E+00 | D10  0.00E+00 | D10  8.89E−19 | D10  3.78E−19 |

Figure 3:
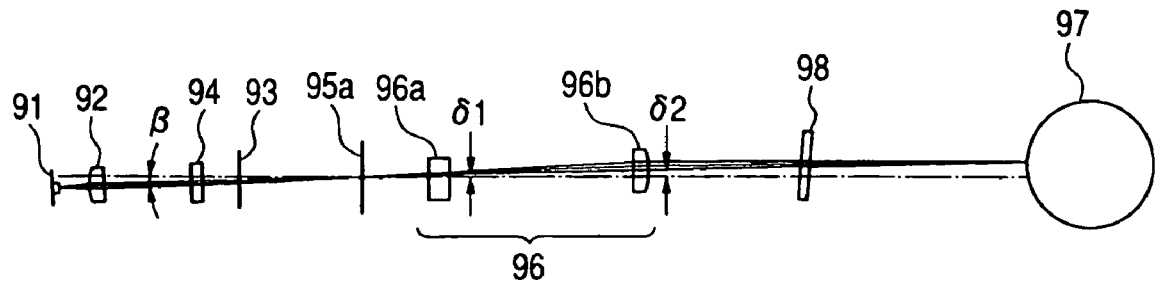
FIG. 3 is a developed view in a sub-scanning cross section of the optical system in Embodiment 1.

FIG. 3 is a sub-scanning cross-sectional view of a scanning optical system in the optical scanning apparatus of the present invention.

The reference numeral 91 designates a light source such as a semiconductor laser, and the reference numeral 92 denotes a collimator lens for converting divergent light from the light source into a parallel beam.

The reference numeral 93 designates an aperture stop which adjusts the diameter of the beam passing therethrough.

The reference numeral 94 denotes a cylindrical lens as a second optical system, and it has predetermined refractive power only in the sub-scanning direction, and causes the beam to be imaged as a substantially linear image on the deflecting surface of a deflector 95 in the sub-scanning cross-section after the beam has passed through the aperture stop 93.

The beam deflected by the deflecting surface 95A is imaged on a photosensitive drum surface as a surface to be scanned by an imaging optical system 96 as a third optical system.

The optical scanning apparatus according to the present embodiment, as shown in FIG. 1, is constructed by the use of a plurality of optical systems of FIGS. 2 and 3, and all of these optical systems have the same optical characteristic.

Two return mirrors 99a and 99b in the present embodiment are disposed in an optical path subsequent to the deflector 95 in order to make an image forming apparatus compact, and are designed to differ in reflectance from each other.

Figure 4:
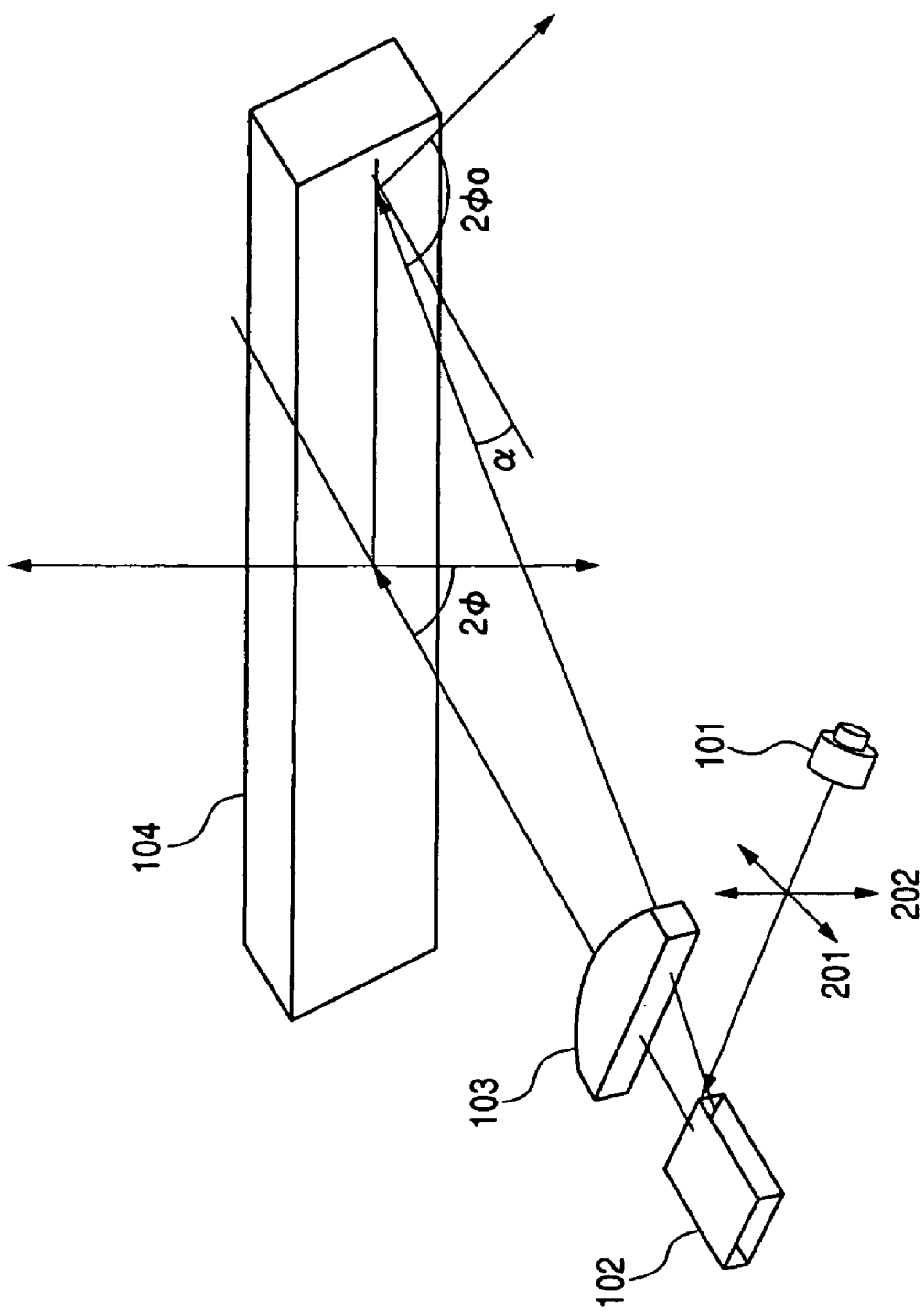
FIG. 4 shows the incidence angle and the scanning angle of the present embodiment.

As shown in FIG. 4, the incidence angle θ onto the return mirror is changed depending on a scanning angle of view α, and is given by the following expression by the use of the incidence angle, φ, of an on-axial beam onto the return mirror.

$$\phi_0 = \cos^{-1}(\cos\alpha \cos\phi) \quad (1)$$

When for example, the on-axis incidence angle φ=45 deg. and the scanning angle of view α=40 deg., the incidence angle $\phi_0$ of the off-axial beam onto the return mirror is 57.2 deg.

Also, when the on-axial beam is incident on the return mirror by S-polarization, the off-axial beam has the polarizing direction with P-polarization intensity $E_p^2$ and S-polarization intensity $E_s^2$ at the following rate.

$$E_P^2 = \frac{\tan^2\alpha\left(\frac{1}{\tan\phi}\right)^2}{\tan^2\alpha + 1 + \tan^2\alpha\left(\frac{1}{\tan\phi}\right)^2} \quad (2)$$

$$E_S^2 = \frac{\tan^2\alpha + 1}{\tan^2\alpha + 1 + \tan^2\alpha\left(\frac{1}{\tan\phi}\right)^2} \quad (3)$$

From the foregoing expressions, when the on-axis incidence angle $\phi=45$ deg. and the scanning angle of view $\alpha=40$ deg. and the on-axial beam is incident on the return mirror by S-polarization, $E_p^2:E_s^2=0.29:0.71$, and from the on-axis to the off-axis, the P-polarized component continuously increases with the angle of view. That is, the incidence angle onto the return mirror continuously changes and the polarizing direction also continuously changes.

In the present embodiment, as shown in FIG. 4, the beam emitted from the light source is linearly polarized light, and the polarizing direction thereof is a direction 201. That is, a P-polarized beam is incident on a deflector 102 and an fθ lens 103. Also, a S-polarized beam is incident on a return mirror 104.

In the present embodiment, the light source means is configured so that the beam emitted therefrom is incident on the deflecting surface of the deflecting means 95 with being P-polarized with respect to the deflecting surface. And the on-axis incidence angle $\phi$ and the scanning angle $\alpha$ are set as follows:

First return mirror 99a: $\phi=21$ deg. $\alpha=33$ deg.
Second return mirror 99b: $\phi=22$ deg. $\alpha=29$ deg.

In order to correct an unevenness in light quantity (unevenness in image plane illuminance) on the drum surface, the reflectance of the return mirror is set so as to be continuously changed depending on the incidence angle and the polarized direction, by the use of the fact that from the on-axis to the off-axis, the incidence angle of a ray onto the return mirror and the polarized direction continuously change.

Figure 5:
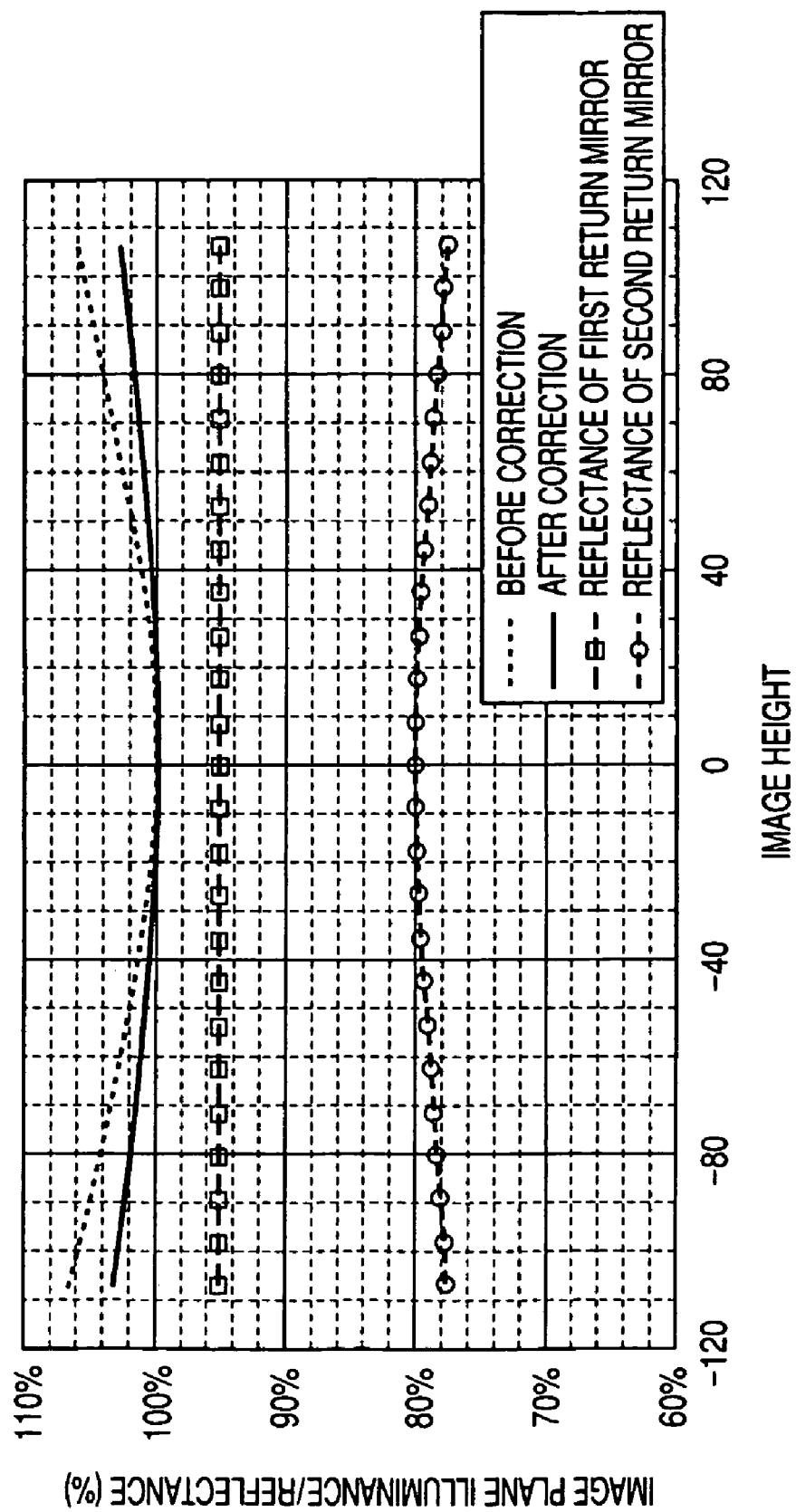
FIG. 5 shows the uneven image plane illuminance correction of Embodiment 1.

FIG. 5 shows unevenness in image plane illuminance in the present embodiment. By the surface reflection (Fresnel reflection) of the fθ lenses 96a, 96b and dust-proof glass 98, the light amount in the off-axis (the end portion of the image) is about 6% greater than that in the on-axis (the center of the image) (before correction). The unevenness in light quantity caused by these fθ lenses is corrected by continuously changing the incidence angle of the aforedescribed deflected beam onto the return mirror and the reflectance for the polarized direction. In the present embodiment, as shown in FIG. 5, the reflectance of the first return mirror for the on-axial beam is set to 95%. The reflecting coat of the return mirror 99a is optimized so that a reflectance difference between the on-axial beam and the off-axial beam may not occur, that is, the reflectance for the off-axial beam may also be 95%, with the angle and polarized direction of the incident beam taken into account. Also, the reflectance of the second return mirror 99b for the on-axial beam is set to 80%, and the reflecting coating is optimized so that the reflectance for the off-axial beam may be 3% lower than that for the on-axial beam, with the angle and polarized direction of the incident beam taken into account. Consequently, the unevenness in image plane illuminance is corrected to 3% (after correction). Thereby, the unevenness in image plane illuminance is made equal to that in an optical path wherein there is only one return mirror (an optical path passing a mirror 100).

The inventor has found that when the reflectance of the return-mirror 99 (in the present embodiment, the second return mirror 99b) is small, it is easy, in coating forming, to constitute the reflecting coating by thin film in which reflectance for the on-axial ray and reflectance for the off-axial ray are different from each other.

So, in the present embodiment, the on-axis reflectance and the off-axis reflectance of the second return mirror 99b are made different from each other.

The inventor has found that reflectance of the reflecting coating, of which the on-axis reflectance and off-axis reflectance can be easily made different from each other, is 90% or less on the optical axis of the imaging optical system 96.

In the present embodiment, the return mirror, of which the reflectance is 90% or less on the optical axis of the imaging optical system 96, is defined as a mirror of small reflectance.

In the present embodiment, consideration is given only to the Fresnel reflection component of the fθ lenses and the dust-proof glass, but it is self-evident that it is also possible to correct unevenness in image plane illuminance due to a difference in the incidence angle dependency of the reflectance of a polygon mirror or the diffraction efficiency of a diffracting optical element, unevenness in image plane illuminance due to the internal absorption by the fθ lens, the reduction of the light amount of an overfilled optical system (OFS), etc.

The overfilled optical system (OFS) applied to the present invention means an optical system in which the width of a beam incident on the deflecting surface of deflecting means in the main scanning direction is greater than the width of the deflecting surface in the main scanning direction.

In the present invention, it is preferable that the image plane illuminance ratio on the surface to be scanned be within 5% in an effective scanning area with the on-axis image plane illuminance as the reference.

Also, in the present embodiment, only two return mirrors are disposed in the optical path, but three or more return mirrors may be disposed, and further a reflecting optical element (curved surface mirror) having optical power such as a cylindrical mirror may be used as a return mirror.

As described above, in the present embodiment, design is made such that the reflectance of the return mirror is continuously changed depending on the incidence angle and the polarized direction to thereby correct unevenness in image plane illuminance, and unevenness in image plane illuminance between respective colors in an in-line scanning system may become uniform, whereby there can be provided a compact optical scanning apparatus of high definition.

As shown in FIG. 5, in the present embodiment, variation in the image plane illuminance ratio on the surface to be scanned is compensated for within 5% in an effective scanning area with the on-axis image plane illuminance as the reference.

In the present invention, a curved surface mirror having optical power in the main scanning direction or/and the sub-scanning direction may be used instead of the return mirror (plane mirror). That is, in order to compensate for the unevenness in image plane illuminance on the surface to be scanned, there may be adopted a configuration in which the on-axis reflectance and off-axis reflectance of the curved surface mirror are made different from each other.

Embodiment 2

Figure 6:
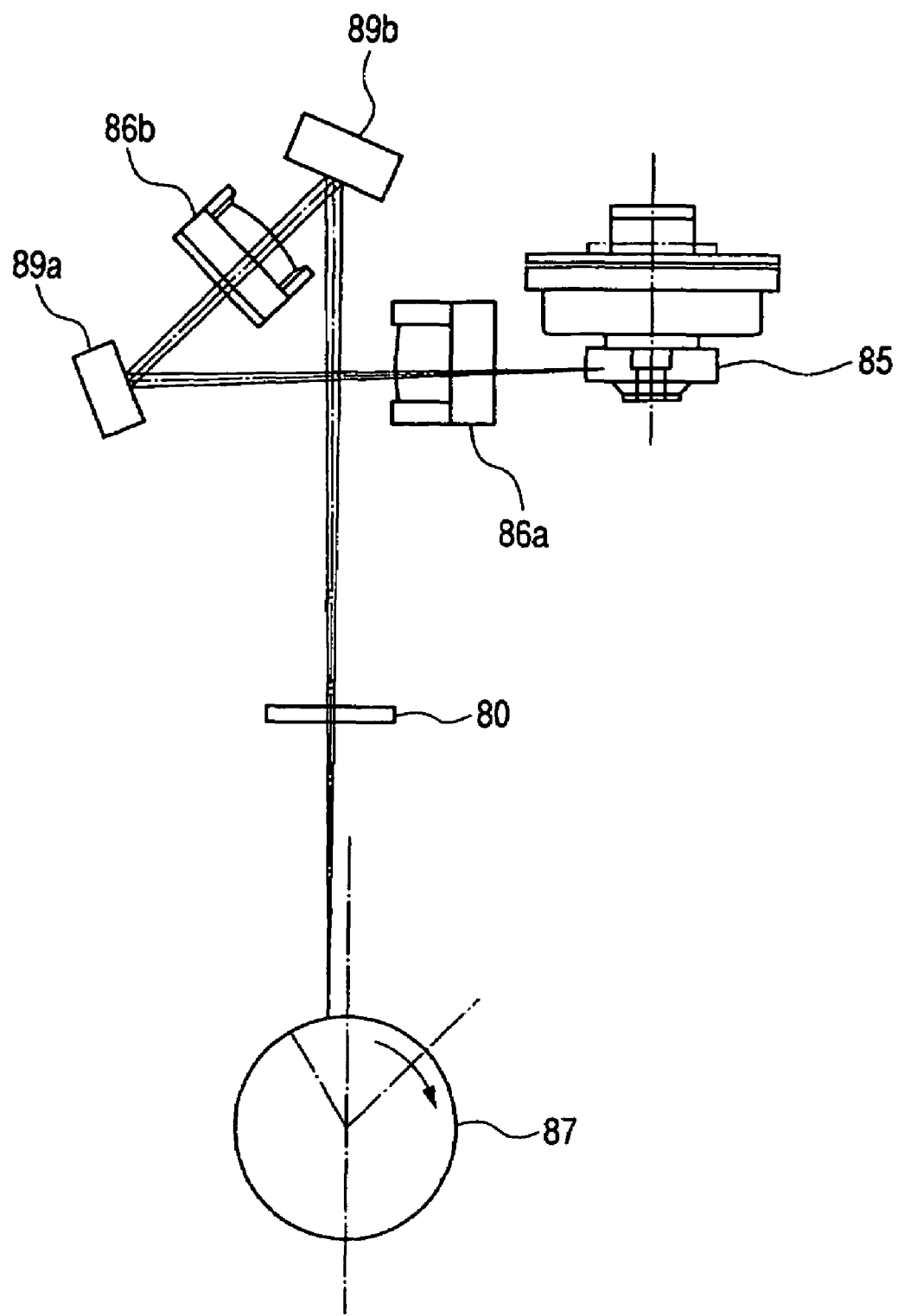
FIG. 6 is a sub-scanning cross-sectional view of Embodiment 2.

FIG. 6 shows a sub-scanning cross-sectional view of an optical scanning apparatus according to this embodiment.

A beam from a light source is incident on the deflecting surface of a deflector 85 by an incidence optical system, not shown. The reference numeral 85 designates a polygon mirror as a deflector, and it is rotated at a uniform speed. An imaging optical system 86 is constituted by fθ lenses 86a and 86b. Each of the fθ lenses 86a and 86b is constituted by an anamorphic lens of an aspherical shape in the main scanning cross section, and they cause the beam deflected by the deflector 85 to be imaged on a photosensitive drum surface 87 as a surface to be scanned, and correct the optical face tangle error of the deflector (optical face tangle error correcting system).

Two return mirrors 89a and 89b in the present embodiment are disposed in an optical path subsequent to the deflector 85 to make the image forming apparatus compact, and are designed to differ in reflectance from each other.

The differences of the present embodiment from Embodiment 1 are that the polarizing direction of a light source with respect to the deflecting surface is S-polarized light (direction 202 in FIG. 4), and that the reflectance of a plurality of return mirrors in an optical path is set low and the unevenness in image plane illuminance is corrected to substantially 0%. In the other points, the construction and effect of the present embodiment are similar to those of Embodiment 1.

Figure 7:
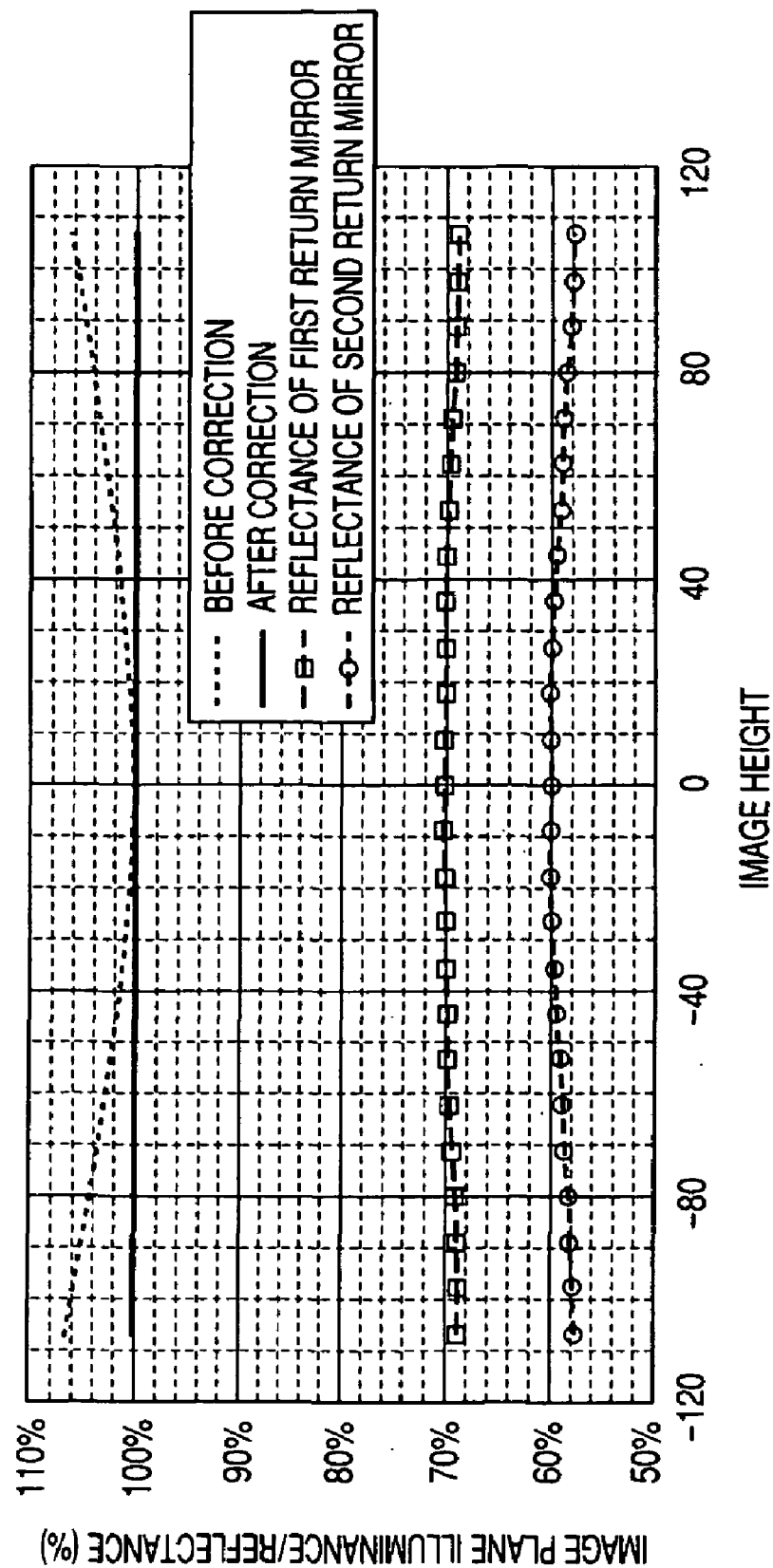
FIG. 7 shows the image plane illuminance unevenness correction of Embodiment 2.

FIG. 7 shows the uneven image plane illuminance correction in the present embodiment. Again in the present embodiment, as in Embodiment 1, the light amount in the off-axis (the end portion of an image) is about 6% more than that in the on-axis (the center of the image) by the surface reflection (Fresnel reflection) of the fθ lenses and the dust-proof glass. The unevenness in light quantity occurring in the fθ lenses is corrected by continuously changing the incidence angle of the aforedescribed deflected beam onto the return mirror, and the reflectance for the polarized direction.

As shown in FIG. 6, the optical scanning apparatus according to the present embodiment has two return mirrors 89a and 89b in the same optical path, and the reflectances for the on-axial beam of the first and second return mirrors 89a and 89b, in order from the deflecting means side, are set to 70% and 60%, respectively. Also, as shown in FIG. 7, unevenness in light amount is corrected by 2% by the first return mirror, and is corrected by 4% by the second return mirror, whereby the unevenness in light quantity on the drum surface is corrected to approximately 0% (substantially uniformly).

The inventor has found that when the reflectance of the return mirror 89 is small, it is easy in coating forming to realize thin coating of which the on-axis reflectance and off-axis reflectance differ from each other.

So, in the present embodiment, the reflectance of these return mirrors 89a and 89b for the on-axial ray and the reflectance thereof for the off-axial ray are made different from each other.

The inventor has found that reflectance of the reflecting coating, of which the reflectance for the on-axial ray and the reflectance for the off-axial ray can be easily made different from each other, is 90% or less on the optical axis of the imaging optical system.

In the present embodiment, a return mirror of which the reflectance is 90% or less on the optical axis of the imaging optical system is defined as a mirror of small reflectance.

In the present embodiment, the polarized direction of the laser diode as the light source means is set so as light beam to be reflected with being S-polarized with respect to the deflector. For this configuration, the laser diode is disposed so that a direction, in which the emission angle of the laser diode is narrower, is set to coincident with the main scanning direction, and a direction, in which the emission angle of the laser diode is wider, is set to coincident with the sub-scanning direction, to thereby enable a necessary light quantity on the drum surface to be secured even when a laser diode of low output is used. Moreover, as compared with a configuration in which light beam emitted from the light source with being P-polarized with respect to the deflecting surface of the deflector is incident on the deflecting surface, the focal length of the cylindrical lens can be shortened and therefore, it also becomes possible to shorten the distance between the laser diode and the deflecting surface.

In the present embodiment, the direction, in which the emission angle of the laser diode as the light source means is narrower, is made coincidence with the main scanning direction (light beam is made incident on the deflecting surface with being S-polarized with respect to the deflecting surface), whereby as compared with a case where the light beam is made incident on the deflecting surface with being P-polarized with respect to the deflecting surface, the exposure light quantity is increased. This leads to the merit that the reflectance of the return mirror can be set low, whereby the reflectance incidence angle dependency and polarizing characteristic of the return mirror can be secured greatly. Also, correction is effected by two mirrors and therefore, the correction amount can be made great.

In the present embodiment, consideration is given to only the Fresnel reflection component of the fθ lenses and the dust-proof glass, but it is self-evident that it is also possible to correct unevenness in image plane illuminance due to the difference in the incidence angle dependency of the reflectance of the polygon mirror or the diffraction efficiency of the diffraction optical element, unevenness in image plane illuminance due to the internal absorption by the fθ lenses, the reduction of the light quantity of the overfilled optical system (OFS), etc.

Also, in the present embodiment, only two return mirrors are disposed in the optical path, but three or more return mirrors may be disposed, and a reflecting optical element having optical power such as a cylindrical mirror can be used.

As described above, in the present embodiment, the polarized direction of the incidence means is optimized and the reflectance of the return mirrors is set low, whereby it becomes possible to provide a compact optical scanning apparatus of high definition which substantially uniformizes the unevenness in light quantity on the surface to be scanned.

As shown in FIG. 7, in the present embodiment, variation in the image plane illuminance ratio on the surface to be scanned is compensated for within ±5% in the effective scanning area with the on-axis image plane illuminance as the reference.

In the present invention, instead of the return mirror (plane mirror), use may be made of a curved surface mirror having optical power in the main scanning direction or/and the sub-scanning direction. That is, in order to compensate for the unevenness in image plane illuminance on the surface to be scanned, there may be adopted a configuration in which the reflectance of the curved surface mirror for the on-axial ray and the reflectance thereof for the off-axial ray are made different from each other.

Embodiment 3

The difference of this embodiment from Embodiment 1 is that the correction amounts of the unevenness in image plane illuminance by each of a plurality of mirrors are made substantially the same. In the other points, the construction and effect of the present embodiment are similar to those of Embodiment 1. The construction of the optical scanning apparatus is similar to that shown in FIG. 1.

Figure 8:
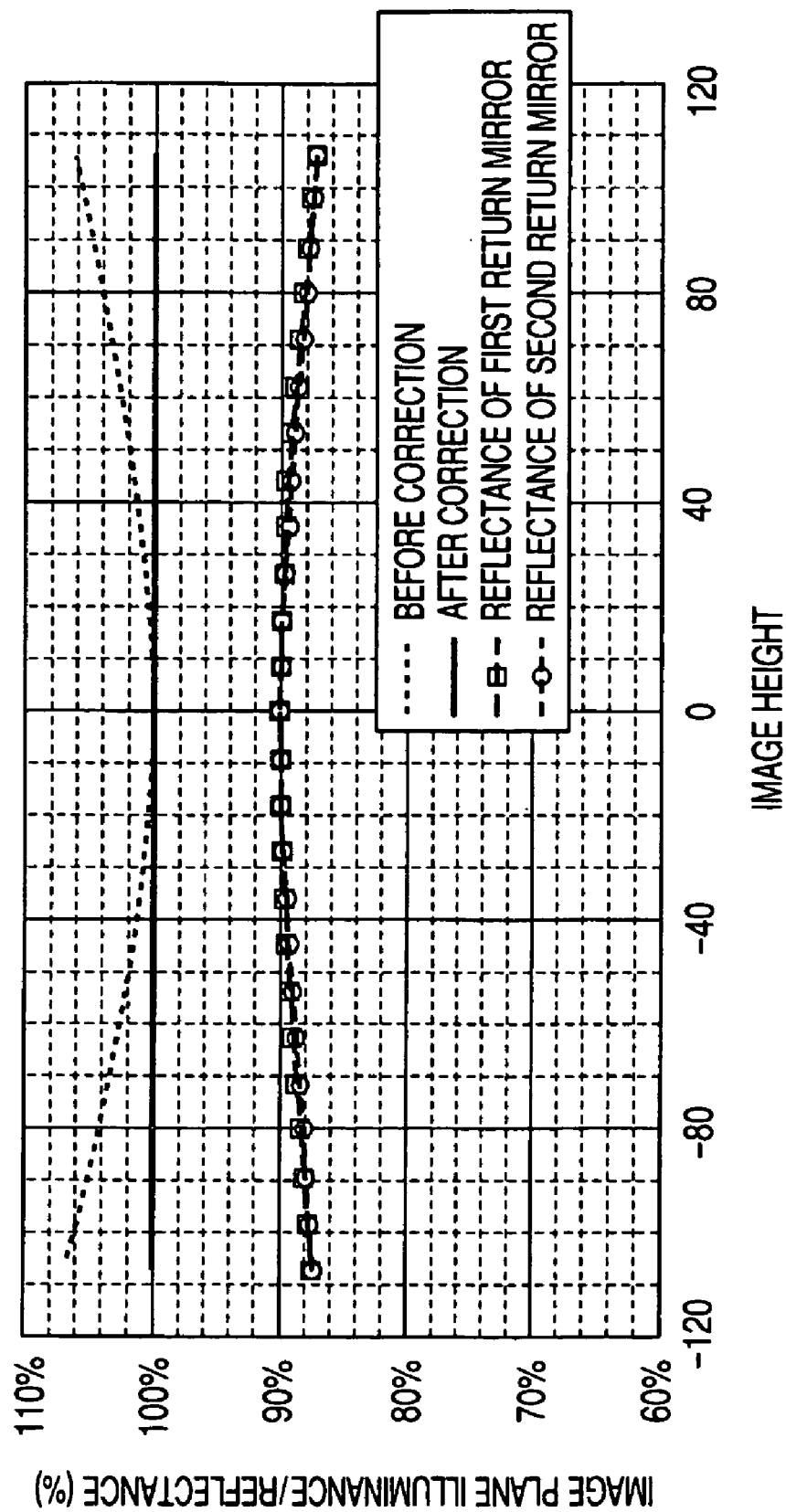
FIG. 8 shows the uneven image plane illuminance correction of Embodiment 3.
Figure 9:
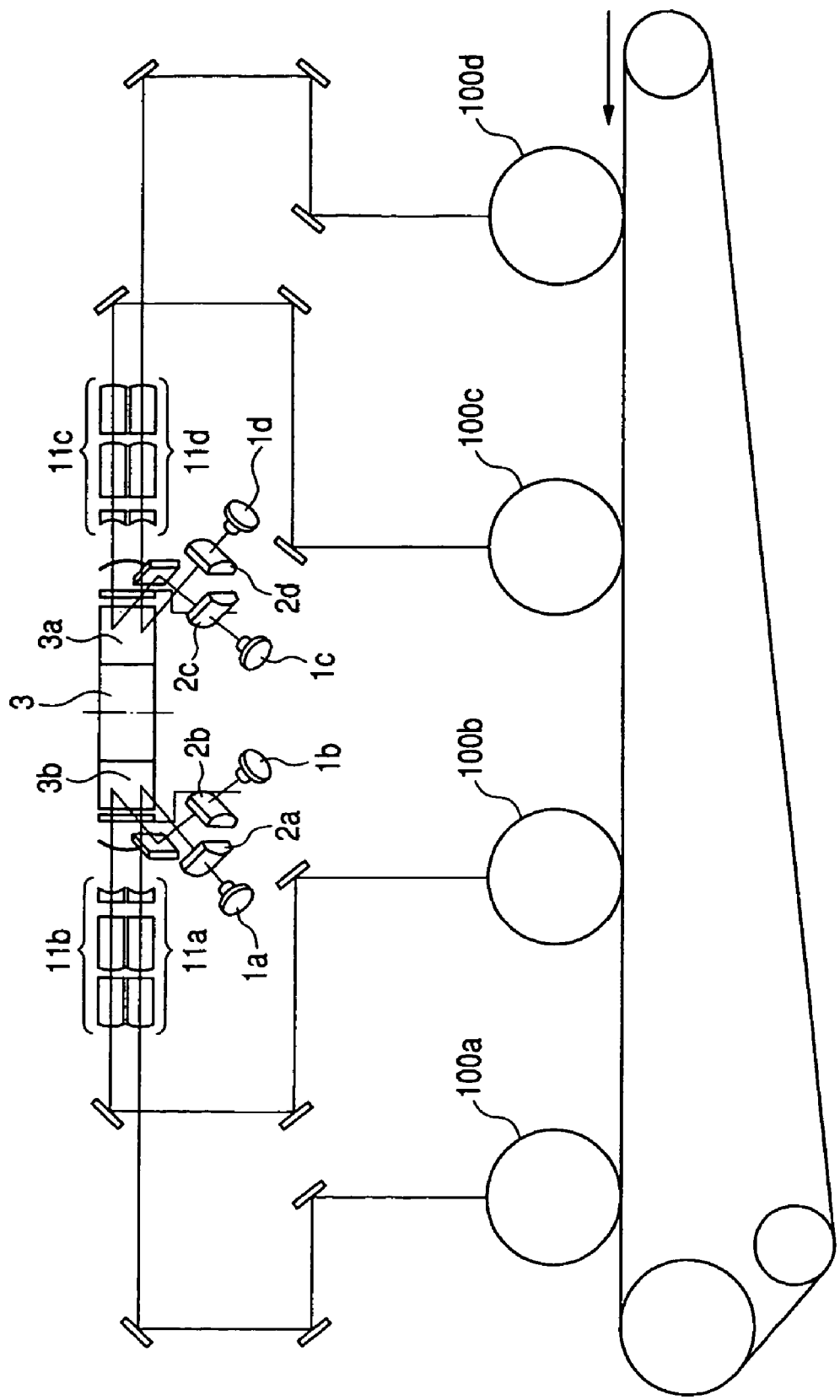
FIG. 9 shows a conventional optical scanning apparatus.

FIG. 8 shows the correction values of the unevenness in image plane illuminance in the present embodiment. Again in the present embodiment, as same as in Embodiment 1, due to the surface reflection (Fresnel reflection) of the fθ lens and the dust-proof glass, the light quantity in the off-axis (the end portion of the image) is about 6% greater than that in the on-axis (the center of the image). The unevenness in light quantity occurring in this fθ lens is corrected by continuously changing the incidence angle of the afore-described deflected beam onto the return mirror, and the reflectance for the polarized direction.

As described in FIG. 6, the optical scanning apparatus according to the present embodiment has two return mirrors 87*a* and 87*b* in the same optical path, and the reflectance for the on-axial beam is set to 90% in both of the first and second return mirrors in order from the deflecting means side. Also, as shown in FIG. 8, the unevenness in light quantity is corrected by 3% by the first return mirror 87*a* and is corrected by 3% by the second return mirror, whereby the unevenness in light quantity on the drum surface is corrected to substantially 0% (substantially uniformly).

The first return mirror and the second return mirror in the present embodiment are the same in the reflectance for the on-axial beam, but differ in the construction of the reflecting coating of the mirrors 87*a* and 87*b* from each other. This is because the incidence angle φ of the beam incident on each mirror differ and scanning angle α differ.

In the present embodiment, the unevenness in image plane illuminance is uniformly corrected by the two first and second return mirrors, and even when use is made of a reflecting mirror of 80% or greater, the unevenness in image plane illuminance can be corrected to substantially 0% (substantially uniformly). Particularly in a system wherein the unevenness in image plane illuminance is as great as 10% or greater, correction can be effected by a plurality of mirrors without the reflectance of the return mirrors being greatly lowered and therefore, a reduction in the light quantity can be prevented and thus, a low output laser is usable and also, there is the effect of reducing consumed power.

In the present embodiment, consideration is given to only the Fresnel reflection component of the fθ lenses and the dust-proof glass, but it is self-evident that it is also possible to correct the unevenness in image plane illuminance due to the difference in the incidence angle dependency of the reflectance of the polygon mirror or the difference in the diffraction efficiency of the diffracting optical element, the unevenness in image plane illuminance due to the internal absorption by the fθ lenses, the reduction of the light quantity of the overfilled optical system (OFS), etc.

Also, in the present embodiment, only two return mirrors are disposed in the optical path, but three or more return mirrors may be disposed, and a reflecting optical element having power such as a cylindrical mirror can be used.

As described above, in the present embodiment, in an optical scanning apparatus having a plurality of return mirrors of high reflectance, reflecting coating is constructed so that the correction amount of unevenness in image plane illuminance may be substantially equal to one another between the respective mirrors, whereby it becomes possible to provide a compact optical scanning apparatus of high definition which substantially uniformizes the unevenness in light quantity on the surface to be scanned.

As shown in FIG. 8, in the present embodiment, variation in the image plane illuminance ratio on the surface to be scanned is compensated for within ±5% in the effective scanning area with the on-axis image plane illuminance as the reference.

Embodiment 4

Figure 11:
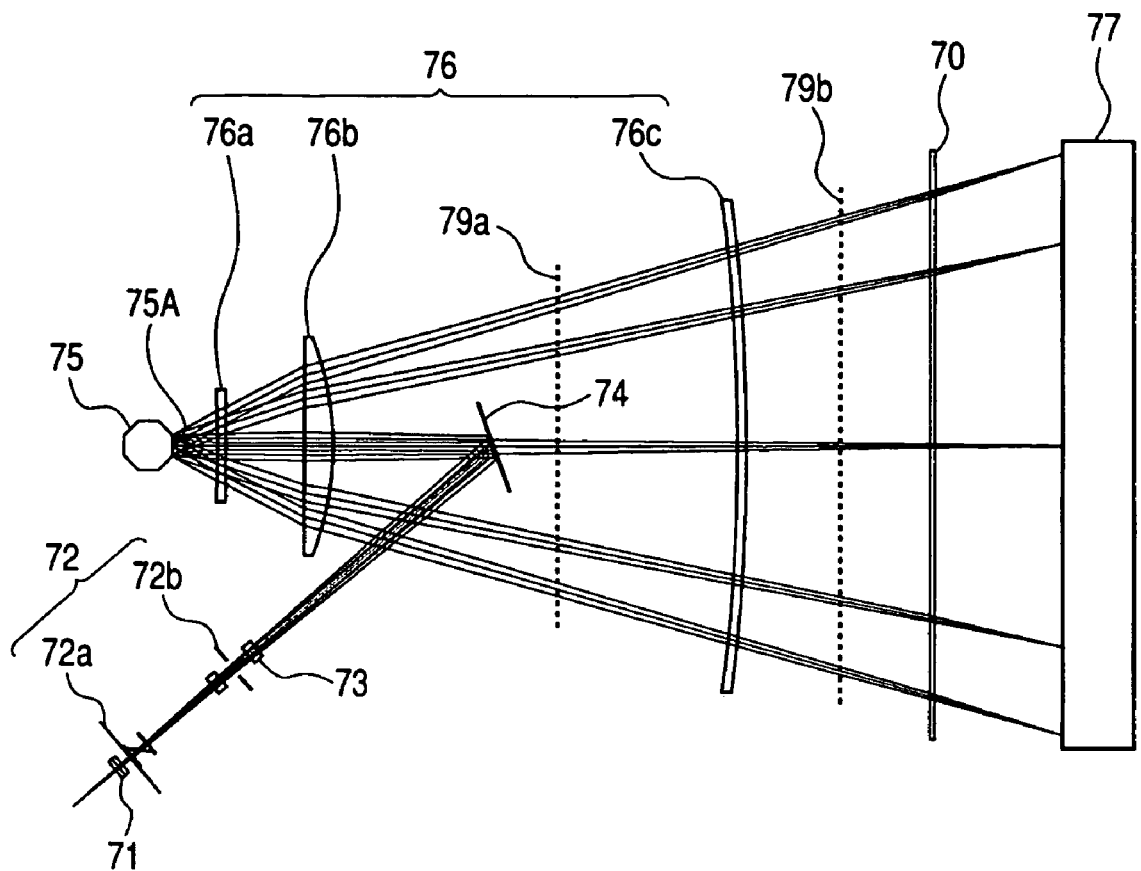
FIG. 11 is a main scanning cross-sectional view of Embodiment 4.

FIG. 11 shows a main scanning cross-sectional view of an optical system in this embodiment.

In Embodiment 4, an OFS optical system is applied instead of the UFS optical system adopted in Embodiment 1. An optical scanning apparatus according to Embodiment 4 is similar to that shown in FIGS. 1, 2 and 3.

The reference numeral 71 designates a light source such as a semiconductor laser which emits a P-polarized beam with respect to a deflecting surface.

The reference numeral 72 denotes a collimator lens constituted by two lenses 72*a* and 72*b* and converting divergent light from the light source into a parallel beam.

The reference numeral 73 designates a cylindrical lens having predetermined refractive power only in the sub-scanning direction, and forming a linear an image in the vicinity of the deflecting surface of a deflector 75 in the sub-scanning cross section.

The reference numeral 74 denotes a plane reflecting mirror which reflects the beam from the cylindrical lens toward the deflector side.

The reference numeral 76 designates an imaging optical system constituted by fθ lenses 76*a*, 76*b* and 76*c*, and comprising spherical surfaces of curvatures shown in the table below and a cylindrical lens. It causes the beam deflected by the deflector 75 to be imaged on a photosensitive drum surface 77 as a surface to be scanned, and corrects the optical surface tangle error of the deflector (optical face tangle error correcting system).

| Used Wavelength (mm) | | | 6.55E−07 |
| --- | --- | --- | --- |
| Incidence Angle in Main Scanning Direction (deg.) | | | 0 |
| Incidence Angle in Sub-Scanning Direction (deg.) | | | 0.8 |
| Deflecting Point-G1R1 (mm) | | | 2.50E+01 |
| Focal Length of fθ Lens (mm) | | | 3.45E+02 |

| | | Surface R1 | | Surface R2 |
| --- | --- | --- | --- | --- |
| | N | 1.77610E+00 | N | 1.00000E+00 |
| | d | 4.00E+00 | d | 4.15E+01 |
| | R | −3.56E+02 | R | ∞ |

| | | Surface R3 | | Surface R4 |
| --- | --- | --- | --- | --- |
| | N | 1.69658E+00 | N | 1.00000E+00 |
| | d | 1.50E+01 | d | 2.99E+02 |
| Main Scanning | R | 0.00E+00 | R | −1.53E+02 |
| Sub-Scanning | r | −1.00E+0.3 | r | ∞ |

| | | Surface R5 | | Surface R6 |
| --- | --- | --- | --- | --- |
| | N | 1.52757E+00 | N | 1.00000E+00 |
| | d | 4.00E+00 | d | 1.68E+02 |
| Main Scanning | R | −1.00E+0.3 | R | −1.00E+0.3 |
| Sub-Scanning | r | 1.14E+02 | r | −1.08E+02 |
| | D2 | 6.63E−06 | D2 | 8.05E−06 |

Figure 12:
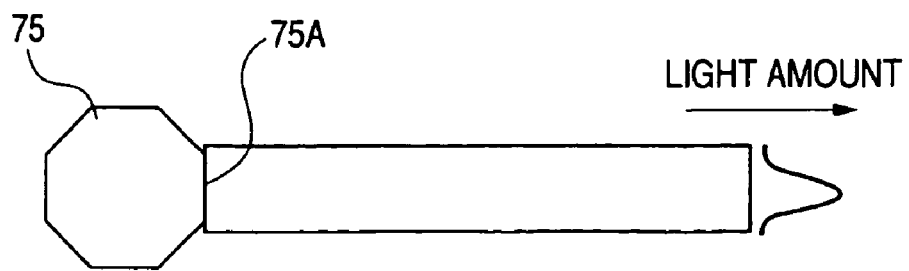
FIG. 12 is a typical view of an overfilled scanning system.

In the present embodiment, as shown in FIG. 12, since the illuminance distribution of the beam emitted from the light source means 71 comprising a semiconductor laser is Gaussian distribution, the beam is a beam in which the light quantity is great at the central portion of the beam and is small at the edge portion of the beam. Consequently, when the beam to be incident on the deflecting surface 75A is made incident on the deflecting surface 75A at a predetermined angle with respect to the optical axis of the imaging optical system 76 in the main scanning cross section, the beam deflected and reflected by the deflecting surface 75A assumes a light amount distribution asymmetrical with respect to the optical axis of the imaging optical system, and there arises the problem of compensating for the asymmetry of the image plane illuminance distribution on the surface to be scanned. Therefore, it is preferable to adopt, in the main scanning cross section, a front incidence system, in which light beam is incident on the deflecting surface 75A of the deflecting means 75 from the same direction as the optical axis of the imaging optical system 76.

In that case, in the main scanning cross section, there is adopted the front incidence system, in which light beam is incident on the deflecting surface 75A of the deflecting means 75 from the same direction as the optical axis of the imaging optical system 76. Therefore, in the case of OFS, the beam deflected and reflected by the deflecting surface 75A becomes smaller in light amount toward the off-axis than toward the on-axis.

In the OFS, the width of the beam incident on the deflecting surface of the deflecting means in the main scanning direction is greater than the width of the deflecting surface in the main scanning direction and therefore, unlike the underfilled optical system (UFS), the light quantity of the beam deflected and reflected by the deflecting surface 75A becomes different depending on the rotation angle of the deflecting means 75 which is a polygon mirror. Because of front incidence, the beam traveling toward the off-axis becomes smaller in light quantity than the beam traveling toward the on-axis.

Figure 13:
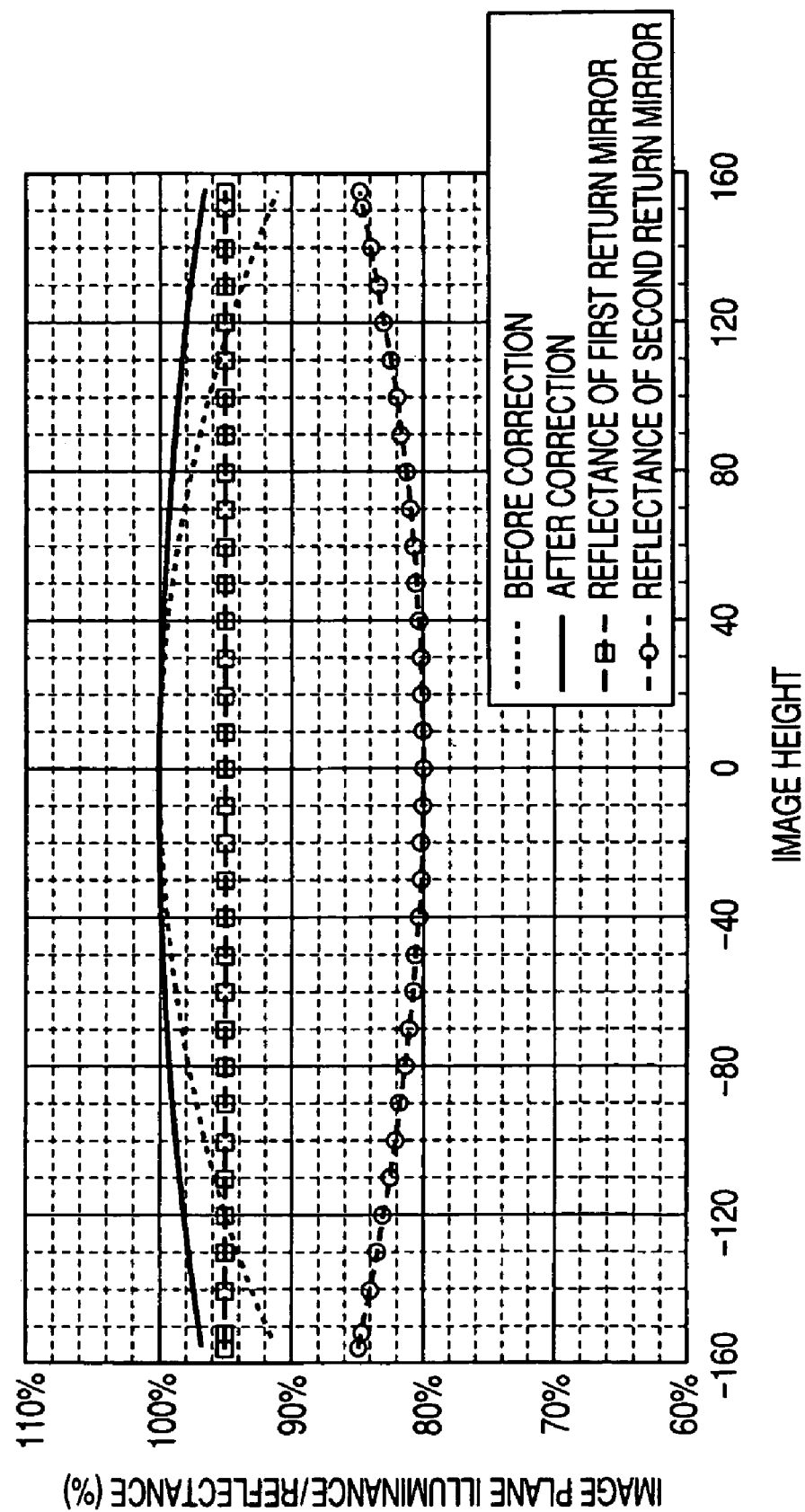
FIG. 13 shows the image plane illuminance unevenness correction amount of Embodiment 4.

So, in the present invention, as shown in FIG. 13, in order to increase the light quantity of the beam traveling toward the off-axis, the reflectance of the second return mirror 79b for the on-axial ray and the reflectance thereof for the off-axial ray are made different from each other. That is, the reflectance of the second return mirror 79b for the off-axial ray is made greater than the reflectance thereof for the on-axial ray. In the present embodiment, the reflectance of the first return mirror is set to 95%, and the reflecting coating of the return mirror 79a is optimized so that a reflectance difference between the on-axial ray and the off-axial ray may not occur, that is, the reflectance for the off-axial ray may also be 95%, with the angle and polarized direction of the incident beam taken into account. Also, the reflectance of the second return mirror 79b for the on-axial ray is 80%, and the reflecting coating is optimized so that the reflectance for the off-axial ray may be 5% higher than the reflectance for the on-axial ray, with the angle and polarized direction of the incident beam taken into account. Consequently, the unevenness in image plane illuminance is corrected to 3% (after correction).

As described above, in the present embodiment, the reflectance of the return mirrors is continuously changed depending on the incidence angle and the polarized direction to thereby correct the unevenness in image plane illuminance, and design is made such that the unevenness in image plane illuminance among respective colors in an in-line scanning system becomes uniform, whereby there can be provided a compact optical scanning apparatus of high definition.

As shown in FIG. 13, in the present embodiment, variation in the image plane illuminance ratio on the surface to be scanned is compensated for within ±5% in the effective scanning area with the on-axis image plane illuminance as the reference.

In the present embodiment, instead of return mirrors (plane mirrors), use may be made of a curved surface mirror having optical power in the main scanning direction or/and the sub-scanning direction. That is, in order to compensate for the unevenness in image plane illuminance on the surface to be scanned, there may be adopted a configuration in which the on-axis reflectance of the curved surface mirror and the off-axis reflectance thereof are made different from each other.

(Image Forming Apparatus)

Figure 10:
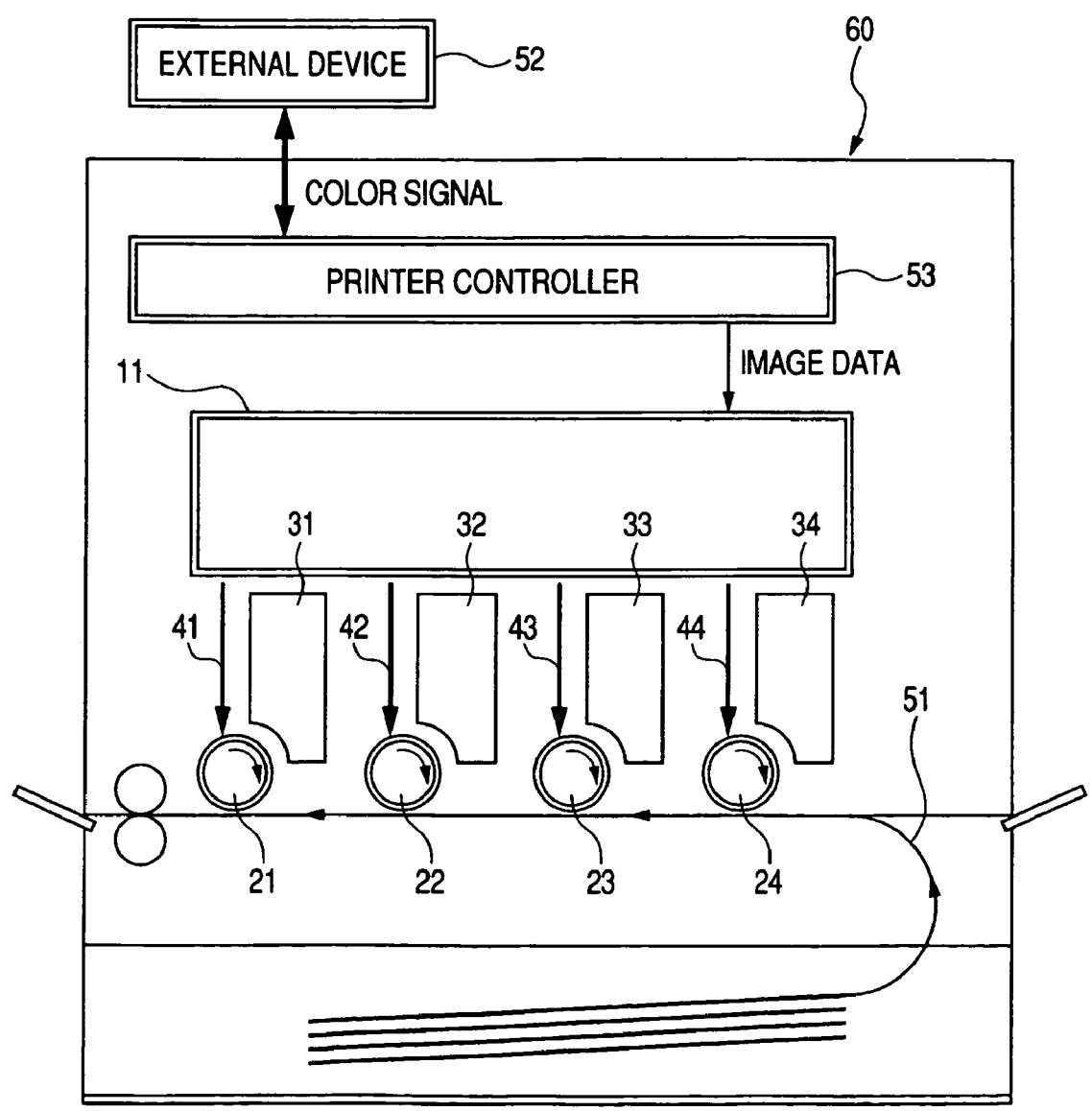
FIG. 10 shows the image forming apparatus of the present invention.

FIG. 10 is a cross-sectional view of essential portions in the sub-scanning direction showing an embodiment of the image forming apparatus of the present invention. In FIG. 10, the reference numeral 60 designates a color image forming apparatus, the reference numeral 11 denotes a scanning optical apparatus having the construction shown in any one of Embodiments 1 to 3, the reference numerals 21, 22, 23 and 24 designate photosensitive drums as image bearing members, the reference numerals 31, 32, 33 and 34 denote developing devices, and the reference numeral 51 designates a conveying belt.

In FIG. 10, red (R), green (G) and blue (B) color signals are inputted from an external device 52 such as a personal computer to the color image forming apparatus 60. These color signals are converted into cyan (C), magenta (M), yellow (Y) and black (B) image data (dot data) by a printer controller 53 in the color image forming apparatus. These image data are inputted to the optical scanning apparatus 11. Light beams 41, 42, 43 and 44 modulated in conformity with the respective image data are emitted from this scanning optical apparatus, and the photosensitive surfaces of the photosensitive drums 21, 22, 23 and 24 are scanned in the main scanning direction with these light beams.

The color image forming apparatus in the present embodiment emits rays of light corresponding to respective colors, i.e., cyan (C), magenta (M), yellow (Y) and black (B), from the single scanning optical apparatus 11, records image signals (image information) on the surfaces of the photosensitive drums 21, 22, 23 and 24, and prints a color image at a high speed.

The color image forming apparatus in the present embodiment, as described above, forms latent images of the respective colors on the surfaces of the photosensitive drums 21, 22, 23 and 24 by the single optical scanning apparatus 11 by the use of light beams based on the respective image data. Thereafter, it multiplexly transfers those images to a recording material to thereby form a sheet of full-color image.

As the external device 52, use may be made, for example, of a color image reading apparatus provided with a CCD sensor. In this case, this color image reading apparatus and the color image forming apparatus 60 together constitute a color digital copying machine.

This application claims priority from Japanese Patent Application No. 2004-041483 filed Feb. 18, 2004, which is hereby incorporated by reference herein.

What is claimed is:

1. An optical scanning apparatus comprising:
light source means having a light emitting portion emitting a light beam;
light beam deflecting means;

an imaging optical system for causing the light beam deflected by the light beam deflecting means to be imaged into a spot shape on a surface to be scanned; and a plurality of mirrors provided in an optical path between the light beam deflecting means and the surface to be scanned, wherein the plurality of mirrors include a first mirror and a second mirror, a reflectance of the first mirror for the light beam reflected on the first mirror is 90% or less and the reflectance of the first mirror for the light beam changes from an on-axis to an off-axis, and a reflectance of the second mirror for an on-axial ray is larger than a reflectance of the first mirror for the on-axial ray and the reflectance of the second mirror for the on-axial ray is equal to a reflectance of the second mirror for an off-axial ray.

2. An optical scanning apparatus according to claim 1, wherein the light beam emitted from the light source means is incident on an incident surface of a scanning lens constituting the imaging optical system with being p-polarized, the reflectance of the first mirror for the light beam incident on the first mirror increases from the on-axis to the off-axis.

3. An optical scanning apparatus according to claim 1, wherein the plurality of mirrors comprise three or more mirrors including the first mirror and the second mirror.

4. An optical scanning apparatus according to claim 1, wherein a width in a main scanning direction of the light beam incident on a polarization surface of the light beam deflecting means is wider than a width in the main scanning direction of the polarization surface.

5. An optical scanning apparatus according to claim 1, wherein a width in a main scanning direction of the light beam incident on a polarization surface of the light beam deflecting means is narrower than a width in the main scanning direction of the polarization surface.

6. An optical scanning apparatus according to claim 2, wherein the scanning lens is a plastic lens.

7. An image forming apparatus, comprising:

an optical scanning apparatus according to claim 1;

a photosensitive member disposed on the surface to be scanned;

a developing device for developing an electrostatic latent image formed on the photosensitive member by scanning with the light beam by the optical scanning apparatus as a toner image;

a transferring device for transferring the developed toner image to a transfer material; and a fixing device for fixing the transferred toner image on the transfer material.

8. An image forming apparatus, comprising:

an optical scanning apparatus according to claim 1; and a printer controller for converting code data inputted from an external device into an image signal and inputting it to the optical scanning apparatus.

9. A color image forming apparatus, comprising:

a plurality of optical scanning apparatuses according to claim 1; and a plurality of image bearing members disposed on the surfaces to be scanned of the respective optical scanning apparatuses for forming images of different colors thereon.

10. A color image forming apparatus according to claim 9, further comprising a printer controller for converting a color signal inputted from an external device into image data of different colors and inputting them to the respective optical scanning apparatuses.

* * * * *